United States Patent [19]
Ajjikuttira

[11] Patent Number: 6,078,226
[45] Date of Patent: Jun. 20, 2000

[54] INTEGRATED CIRCUIT IMPLEMENTATION OF A FREQUENCY SHIFT KEYING OSCILLATOR

[75] Inventor: Aruna B. Ajjikuttira, Singapore, Singapore

[73] Assignee: Tritech Microelectronics, Ltd., Singapore, Singapore

[21] Appl. No.: 09/017,479

[22] Filed: Feb. 2, 1998

[51] Int. Cl.$^7$ ................................................ H04L 27/12
[52] U.S. Cl. ......................... 331/179; 331/185; 375/272; 332/102
[58] Field of Search ................................. 332/102, 100; 331/179, 186, 116 R, 182, 185, 116 FE; 375/272, 278

[56] References Cited

U.S. PATENT DOCUMENTS

| | | | |
|---|---|---|---|
| 3,991,389 | 11/1976 | Dwire et al. | |
| 4,618,966 | 10/1986 | Stepp et al. | 375/303 |
| 5,367,537 | 11/1994 | Anderson | 332/102 |
| 5,532,654 | 7/1996 | Ieki et al. | 332/102 |
| 5,550,505 | 8/1996 | Gaus, Jr. | 329/300 |
| 5,793,261 | 8/1998 | Boling, III | 332/102 |

*Primary Examiner*—Arnold Kinkead
*Attorney, Agent, or Firm*—George O. Saile; Stephen B. Ackerman; Billy Knowles

[57] ABSTRACT

A multiple frequency shifting oscillator that will provide a plurality of frequencies dependent upon a contents of an input shifting signal an input shifting signal is disclosed. The multiple frequency shifting oscillator has an amplifier with first input, a second input, which is coupled to a ground reference potential and an output. The multiple frequency shifting oscillator has a first impedance that is coupled between the first input of the amplifier and the ground reference potential, a second impedance that is coupled between the output of the amplifier and the ground reference potential, and a third impedance coupled between the output and the input of the amplifier. The multiple frequency shifting oscillator has a plurality of frequency shifting impedances that when selected will be coupled to the first impedance so as to shift the frequency of the multiple frequency shifting oscillator. Each of a plurality of switches is connected to each of the frequency shifting impedances and to the first impedance so as to select any of the frequency shifting impedances to the first impedance to shift the frequency according to the digital input signal. A frequency shifting controller will selectively activate any of the plurality of switches to select any of the plurality of frequency shifting impedances dependent upon contents of input shifting signal. The base biasing current source will have a power down switch to disable the base biasing current source during periods of time when the multiple frequency shifting oscillator is not active.

35 Claims, 6 Drawing Sheets

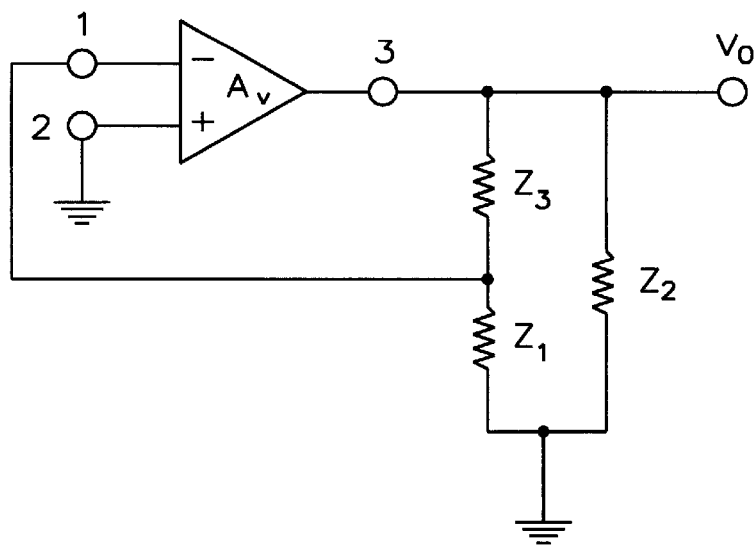
FIG. 1 — Prior Art
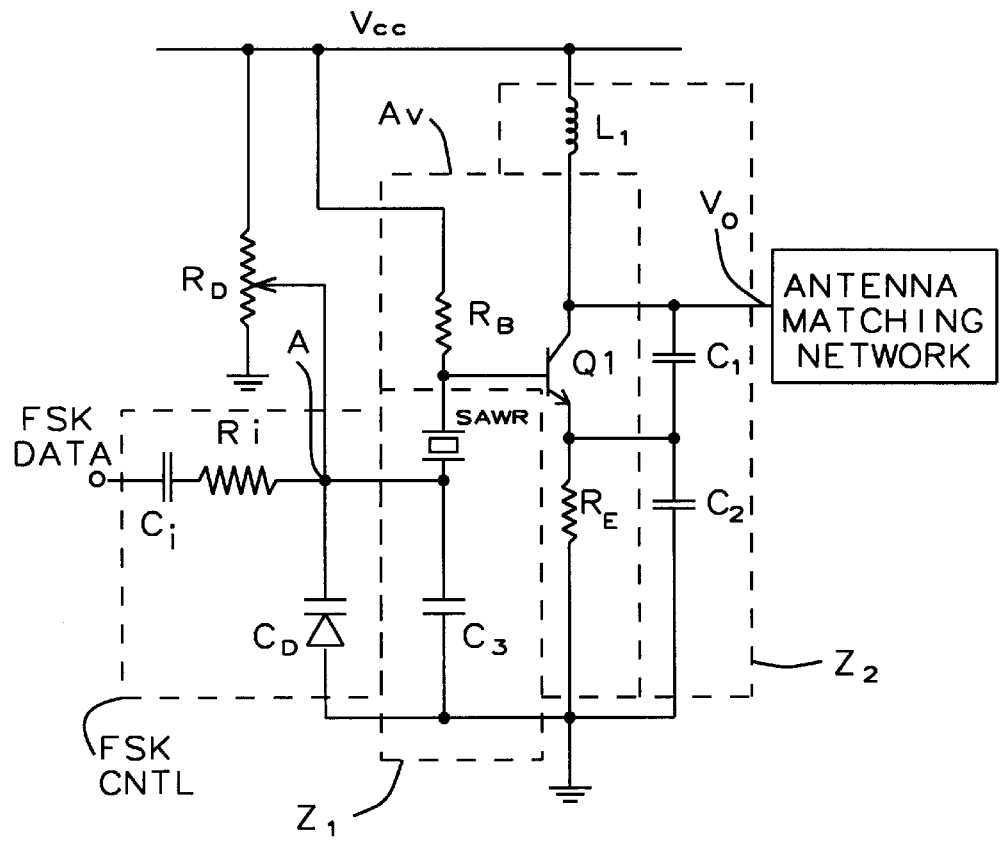
FIG. 2 — Prior Art

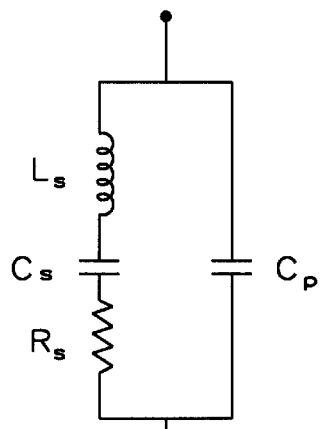
FIG. 3 – Prior Art
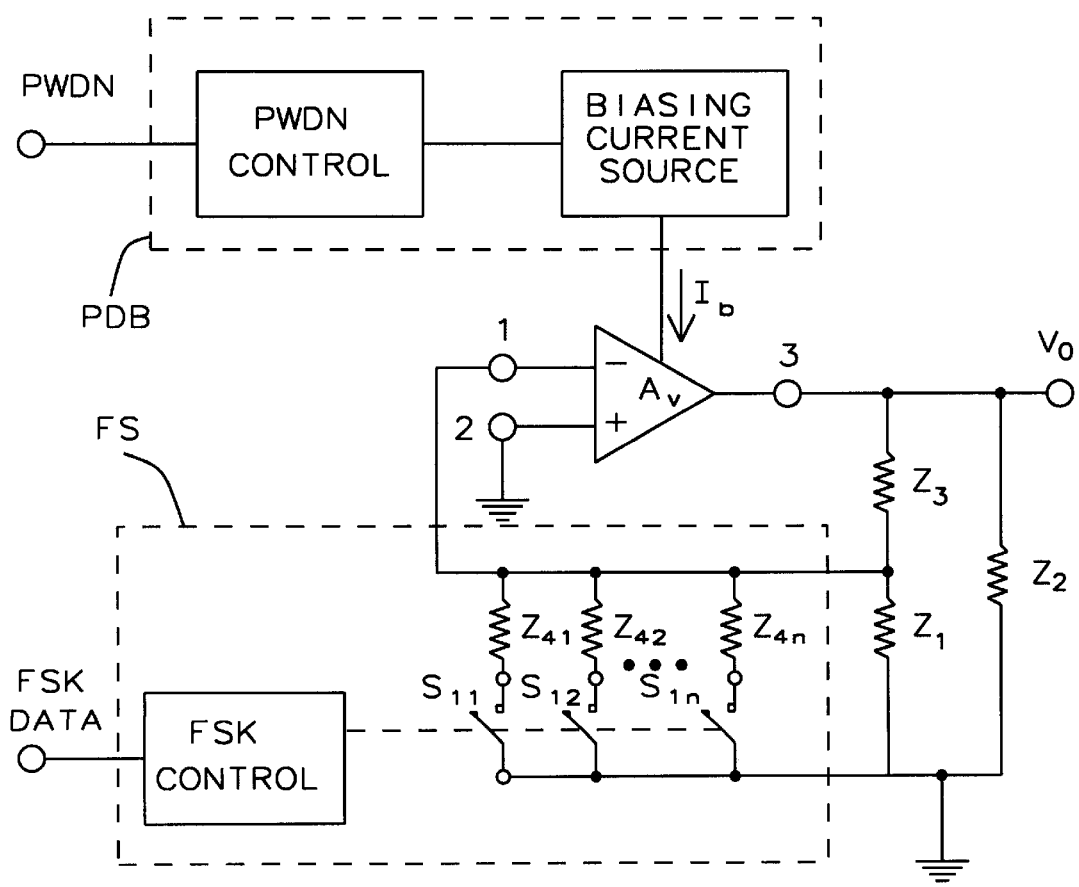
FIG. 4a

INTEGRATED CIRCUIT IMPLEMENTATION OF A FREQUENCY SHIFT KEYING OSCILLATOR

BACKGROUND OF THE INVENTION

1. Field Of The Invention

This invention relates generally to electronic oscillating circuits and more particularly to frequency shift keying oscillators wherein the frequency of the oscillator is discretely controlled by a digital signal.

2. Description of Related Art

Oscillators and the modulation of frequencies for frequency shift keying (FSK) transmission of digital data signals is well known in the art. To review a general form of an oscillator circuit of the prior art, refer FIG. 1. A three terminal amplifier Av has its first input terminal 1 connected to the junction of impedances $Z_1$ and $Z_3$. The output terminal 3 is connected to the impedances $Z_2$ and $Z_3$, and to the output signal terminal $V_o$. The output signal terminal $V_o$ will be connected to external circuitry. The topology of this structure allows for a series voltage feedback that will allow the circuit to oscillate at a frequency dependent on the impedances $Z_1$, $Z_2$, and $Z_3$.

It can be shown that the open loop gain A of this circuit is:

$$A = \frac{-A_V Z_L}{(Z_L + R_O)} \quad \text{Eq. 1}$$

Where:
$A_v$ is the gain of the amplifier Av.
$Z_L$ is the parallel combination of impedances $Z_2$, and $Z_1$, and $Z_3$ in series.
$R_o$ is the output impedance of the amplifier Av.

Further it can be shown that the feedback factor β is:

$$\beta = -\frac{Z_1}{Z_1 + Z_3} \quad \text{Eq. 2}$$

And the loop gain then becomes:

$$-A\beta = \frac{-A_V Z_1 Z_2}{R_O(Z_1 + Z_2 + Z_3) + Z_2(Z_1 + Z_3)} \quad \text{Eq. 3}$$

If the impedances $Z_1$, $Z_2$, and $Z_3$ are pure reactances, that is, if $Z_1=jX_1$, $Z_2=jX_2$, and $Z_3=jX_3$, then:

$$-A\beta = \frac{-A_V X_1 X_2}{R_O(X_1 + X_2 + X_3) + X_2(X_1 + X_3)} \quad \text{Eq. 4}$$

For the loop gain —Aβ to be real (zero phase shift) then $$X_1+X_2+X_3=0 \quad \text{Eq. 4b}$$

and $$-A\beta = \frac{-A_V X_1}{X_1 + X_3} \text{ or} \quad \text{Eq. 5}$$

$$-A\beta = \frac{A_V X_1}{X_2} \quad \text{Eq. 6}$$

In order for the circuit to oscillate the loop gain must be positive with at least unity magnitude. This means that the reactances $X_1$ and $X_2$ must either be both inductive or both capacitive and the reactance $X_3$ must be of the opposite sign. That is, if the impedances $Z_1$ and $Z_2$ are capacitors then impedance $Z_3$ must be an inductor, or if the impedances $Z_1$ and $Z_2$ are inductors then impedance $Z_3$ must be a capacitor. If the reactances $X_1$ and $X_2$ are capacitive and the reactance $X_3$ is inductive, the oscillator has a topology referred to as a Colpitts oscillator.

Refer now to FIG. 2 for a review of a practical Colpitts oscillator of prior art. The amplifier Av of FIG. 1 is formed by the NPN bipolar junction transistor (BJT) $Q_1$ and resistors $R_B$ and $R_E$. The resistor $R_B$ provides a bias current to keep the transistor $Q_1$ in a conducting state, while the resistor $R_E$ and the transistor $Q_1$ develop the output signal at the output terminal $V_o$.

The impedance $Z_1$ of FIG. 1 is formed by the series combination of the surface acoustic wave resonator SAWR and the capacitor $C_3$. The parallel combination of the inductor $L_1$ and the series combination of the capacitors $C_1$ and $C_2$ form the impedance $Z_2$. The impedance $Z_3$ of FIG. 1 will be formed by the parasitic capacitance from the base to the collector of the transistor $Q_1$.

To achieve oscillation, the resonant frequency $F_r$ of the impedance $Z_2$ should be near the frequency of resonance of the SAWR. The frequency of resonance for the impedance $Z_2$ then is given by:

$$F_r = \frac{1}{2\pi\sqrt{L_1 + \frac{C_1 \cdot C_2}{C_1 + C_2}}} \quad \text{Eq. 7}$$

The equivalent circuit of the SAWR is shown in FIG. 3. The frequency of oscillation will be the series resonance frequency $F_s$ and the parallel resonance frequency $F_p$ of the SAWR. The series resonance frequency is given by:

$$F_s = \frac{1}{2\pi\sqrt{L_s C_s}} \quad \text{Eq. 8}$$

And the parallel resonance frequency is given by:

$$F_p = \frac{1}{2\pi\sqrt{L_s + \frac{C_s \cdot C_p}{C_s + C_p}}} \quad \text{Eq. 9}$$

The series capacitor $C_s$ is generally very small (on the order of 2 fF), while the parallel capacitor $C_p$ will be several orders of magnitude larger (on the order of 2 pF). By placing a capacitor in series with the SAWR, the series resonant frequency $F_s$ can be changed by a small amount. The capacitor is in series with the SAWR and will allow a deviation sufficient to permit the transmission of digital data by frequency shift keying.

Referring back to FIG. 2, the capacitor $C_3$ is placed in series with the SAWR to establish a base frequency. In order to change the frequency of the oscillator, a voltage variable capacitor or varactor $C_D$ is placed in parallel with the capacitor $C_3$. The varactor $C_D$ is a specially designed diode that is reversed biased. As the voltage at the point A increases, the barrier capacitance of the reversed biased diode decreases. The variable resistor $R_D$ establishes the reverse bias voltage at point A. The FSK data signal is coupled through the capacitor $C_i$ and the resistor $R_i$ to modify the voltage and therefore the capacitance of the varactor diode $C_D$.

This changing of the voltage at node A will allow the Colpitts oscillator to transmit a high frequency signal that will be modulated by the digital data signal FSK data.

The data output signal $V_o$ will be connected to an external circuit such as an antenna matching network to transmit the modulated signal.

The varactor, in general, is difficult to incorporate into an integrated circuit. Additionally, the varactor requires large change in voltage to achieve a reasonable change in capacitance needed for FSK modulation.

Refer now to resistor $R_B$ of FIG. 2. The resistor $R_B$ provides the bias current necessary to keep the transistor $Q_1$ in a conducting state. This will allow the transistor $Q_1$ to act as the amplifier for the Colpitts FSK oscillator. However, during periods of non-operation the biasing current of the transistor $Q_1$ causes additional power dissipation. Additionally the collector current of transistor $Q_1$ in practical integrated circuits will be on the order of 2–4 milliamps. This will force the resistor $R_B$ to have a resistance of from 10K–100k ohms. Good quality resistors of this magnitude require large areas on an integrated circuit. (Good quality resistors are those resistors whose values can be well controlled and that are not affected by variations in temperature and variations in the power supply voltage source.)

U.S. Pat. No. 4,618,966 (Stepp, et al.) discloses a technique for modulating a carrier wave to one of M different output frequencies. The carrier wave will be varied by a discrete frequency determined by a clocked digital signal having n bits. This will have the number of frequencies M equal to $2^n$. The individual frequencies are created and combined with the carrier wave to create a constant amplitude signal.

U.S. Pat. No. 5,550,505 (Gaus, Jr.) and U.S. Pat. No. 3,991,389 (Dwire, et al.) each describe FSK demodulators. The FSK demodulator will detects the incoming FSK signal and extract the encoded binary signal.

SUMMARY OF THE INVENTION

An object of this invention is to provide an oscillator circuit capable of producing multiple frequencies dependent upon a digital input signal.

Another object of this invention is to provide a frequency shift keying oscillator that requires less current for operation and occupies less area on an integrated circuit.

To accomplish these and other objects a multiple frequency shifting oscillator [that will] provides a plurality of frequencies dependent upon the magnitude of an input shifting signal. The multiple frequency shifting oscillator has an amplifier. The amplifier has a first input, a second input, which is coupled to a ground reference potential, and an output. The multiple frequency shifting oscillator has a first impedance that is coupled between the first input of the amplifier and the ground reference potential, a second impedance that is coupled between the output of the amplifier and the ground reference potential, and a third impedance coupled between the output and the first input of the amplifier.

The multiple frequency shifting oscillator has a plurality of frequency shifting impedances that when selected will be coupled to the first impedance so as to shift the frequency of the multiple frequency shifting oscillator. Each of a plurality of switches is connected to each of the frequency shifting impedances and to the first impedance so as to select any of the frequency shifting impedances to be connected to the first impedance to shift the frequency according to the digital input signal.

The multiple frequency shifting oscillator has a frequency shifting controller to selectively activate any of the plurality of switches to select any of the plurality of frequency shifting impedances dependent upon contents of input shifting signal.

The amplifier of the multiple frequency shifting oscillator consists of a bipolar junction transistor. The collector of the bipolar junction transistor is connected to a first electrode of the third impedance and a base biasing current source connected between the base and a power supply voltage source to provide sufficient biasing current to insure the bipolar junction transistor is in a conducting state. An emitter resistance is coupled between the emitter and the ground reference potential to develop one of the plurality of frequencies.

A piezoelectric resonator and a first frequency modification capacitor coupled to the piezoelectric resonator to modify the resonance frequency of the piezoelectric resonator form the first impedance of the multiple frequency shifting oscillator. The piezoelectric resonator is generally a surface acoustic wave resonator.

The second impedance is a parallel combination of an inductor coupled to the output of the amplifier and a series combination of a first capacitor and a second capacitor. The third impedance will generally be a parasitic impedance of the amplifier.

The base biasing current source will have a power down switch to disable the base biasing current source during periods of time when the multiple frequency shifting oscillator is not active.

BRIEF DESCRIPTION OF THE DRAWINGS

FIG. 1 is schematic diagram of a basic configuration of a resonant circuit oscillator of the prior art.

FIG. 2 is a schematic diagram of a Colpitts frequency shift keying oscillator of the prior art.

FIG. 3 is a schematic diagram of a surface acoustic wave resonator of the prior art.

FIG. 4a is a schematic diagram of a first basic configuration of frequency shift keying oscillator of this invention.

DETAILED DESCRIPTION OF THE INVENTION

To understand the basic configuration of an FSK oscillator of this invention, refer now to FIG. 4a. The general form of the oscillator circuit of FIG. 1 is incorporated with the amplifier Av and the impedances $Z_1$, $Z_2$, and $Z_3$. The frequency of oscillation will be modified by the frequency shifter FS.

The frequency shifter FS is composed of the multiple impedances $Z_{41}$, $Z_{42}$ ..., $Z_{4n}$. In series with each of the impedances $Z_{41}$, $Z_{42}$ ..., $Z_{4n}$ is a switch $S_{11}$, $S_{12}$ and $S_{1n}$. When any of the switches are closed, the associated impedance is placed in parallel with the impedance $Z_1$. As can be seen from Eq. 5 and Eq. 6, this will change the frequency of oscillation of the oscillator.

The switches $S_{11}$, $S_{12}$ and $S_{1n}$ each have a switch control line connected to the FSK Control. The FSK input signal FSK data is a multiple bit digital word that is decoded to select the appropriate switches $S_{11}$, $S_{12}$ and $S_{1n}$. The appropriate combination of switch selection will permit $2^n$ discrete frequencies from the oscillator (where n is the number of bits in the FSK input signal). If the output $V_o$ is connected to external circuitry such as the antenna matching network of FIG. 2, the FSK input signal FSK data can be conveyed by transmitting the discrete frequency of the oscillator created by selecting the appropriate impedance $Z_{41}$, $Z_{42}$ ..., $Z_{4n}$.

Figure 4B:
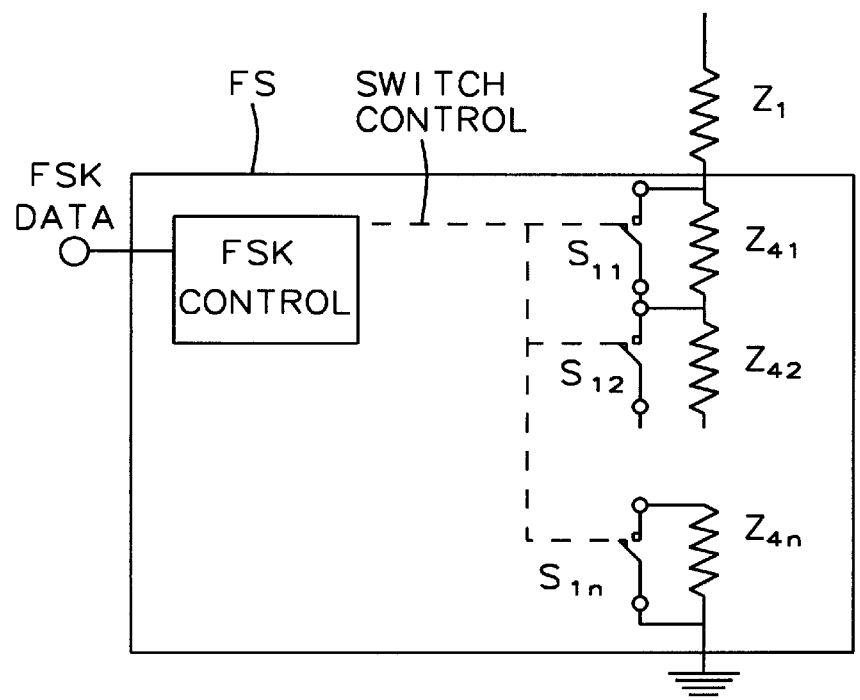
FIG. 4b is a schematic diagram of a second basic configuration of a frequency shifter of this invention.

A second embodiment of this frequency shifter FS is shown in FIG. 4b. In this embodiment, the impedances $Z_{41}$, $Z_{42}$ ..., $Z_{4n}$ are connected in series between the impedance $Z_1$ and the ground reference potential. In parallel with each impedance $Z_{41}$, $Z_{42}$ ..., $Z_{4n}$ will be a switch $S_{11}$, $S_{12}$, and $S_{1n}$. When each of the switches $S_{11}$, $S_{12}$, and $S_{1n}$ is closed, the corresponding impedance $Z_{41}$, $Z_{42}$ ..., $Z_{4n}$ will be bypassed and the frequency of oscillation will be modified.

The FSK Control will decode the FSK input signal FSK data as described above to select through the switch control line which switch is to be activated. If all the switches $S_{11}$, $S_{12}$, and $S_{1n}$ are activated the impedance $Z_1$ alone determines the frequency of the FSK oscillator. However, if all the switches $S_{11}$, $S_{12}$, and $S_{1n}$ are open the impedance $Z_1$ in series with the impedances $Z_{41}$, $Z_{42}$ ..., $Z_{4n}$ will determine the frequency of the oscillation. As shown in FIG. 4a, the number of discrete frequencies will be $2^n$, where n is the number of bits in the FSK input signal FSK data.

In portable battery-powered applications that require wireless transmission of FSK data, energy conservation is a prime concern. In FIG. 4a, the power down block pdb will control the application of a biasing current to the amplifier Av. The biasing current $I_b$ will activate the amplifier Av to transmit the discrete frequency determined by the FSK input signal FSK data.

The power down block pdb is comprised of a biasing current source that will generate the biasing current $I_b$. A power down control circuit PWDN Control will selectively activate or deactivate the biasing current source. The state of the power down signal PWDN determines whether the power down control circuit PWDN Control will activate or deactivate the biasing current source.

Figure 5A:
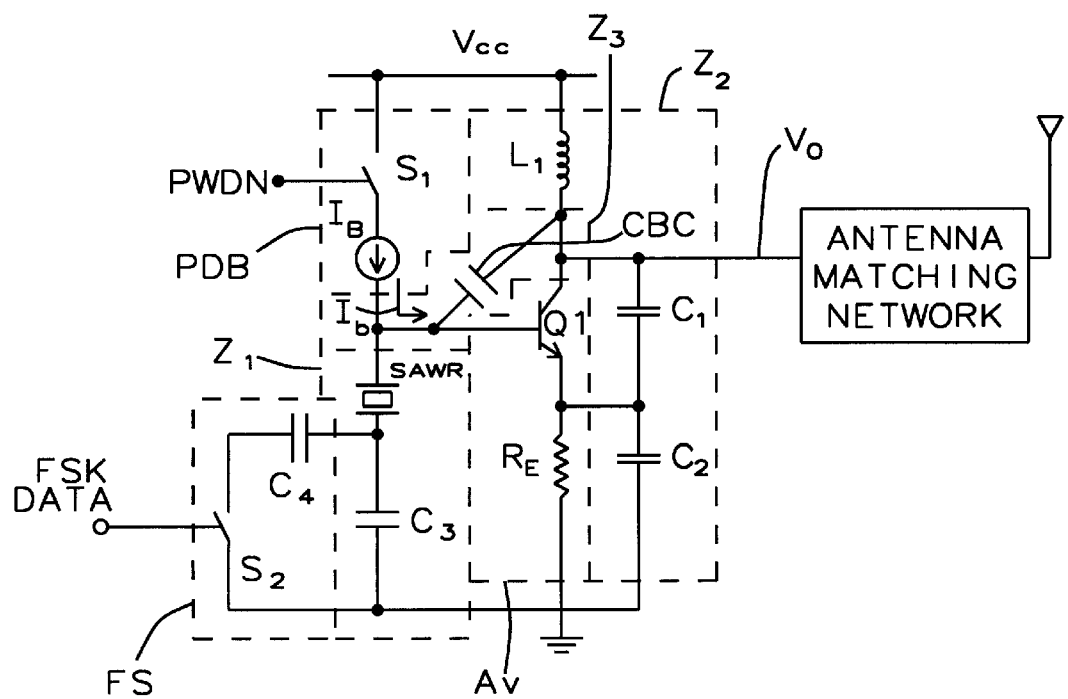
FIG. 5a is a schematic diagram of a first embodiment of a Colpitts frequency shift keying oscillator of this invention.

Refer now to FIG. 5a for a preferred embodiment of this invention. The transistor $Q_1$ and resistor $R_e$ form the amplifier Av of FIG. 4a. The impedance $Z_1$ of FIG. 4 is formed by the surface acoustic wave resonator SAWR and capacitor $C_3$, and impedance $Z_2$ of FIG. 4 is formed by the parallel combination of inductor $L_1$ and capacitors $C_1$ and $C_2$ in series. The impedance $Z_3$ is formed by the parasitic collector-base junction capacitance $C_{BC}$ of the transistor $Q_1$. The power down block pdb of FIG. 4 is formed by the current source $J_b$ and switch $S_1$. The frequency shifter FS of FIG. 4 is formed by the capacitor $C_4$ and switch $S_2$.

If switch $S_1$ is closed and switch $S_2$ is open, the FSK oscillator operates as above described in FIG. 2. To transmit the FSK input signal FSK data, which in this case is a serial stream of digital data, the switch $S_2$ is opened and closed in response to the state of the FSK input signal FSK data. When the FSK input signal FSK data is at a first state (0), the switch $S_2$ will remain open and the oscillator will oscillate at a primary frequency. However, if the FSK input signal is at a second state (1), the switch $S_2$ will be closed and the oscillator will oscillate at a secondary frequency. The FSK input signal FSK data can then be conveyed to the output node $V_o$ to be transmitted to the external circuitry of the antenna matching network for transmission.

Figure 5B:
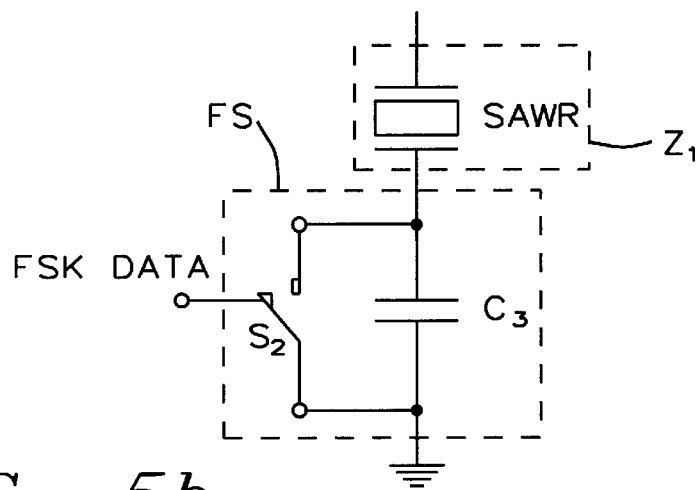
FIG. 5b is a schematic diagram of a second embodiment of a frequency shifter of this invention.

FIG. 5b shows a second embodiment of the frequency shifter FS. In this case the SAWR is the first impedance $Z_1$ of FIG. 4b and the capacitor $C_3$ forms the frequency modifying impedance $Z_{41}$, $Z_{42}$ ..., $Z_{4n}$ of FIG. 4b. If the FSK input signal FSK data is at a first logic state (0), the switch $S_2$ will remain open and the frequency of the FSK oscillator will be determined by the series combination of the SAWR and the capacitor $C_3$. If the FSK input signal FSK data is a the second logic state (1), the switch $S_2$ will close and the frequency of the FSK oscillator will be the resonant frequency of the SAWR.

Figure 6A:
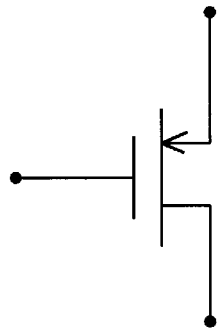
FIGS. 6a–6d are schematic diagrams of implementation of the frequency shift control switch of this invention.
Figure 6B:
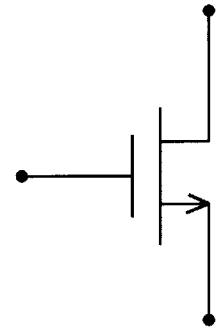
Figure 6C:
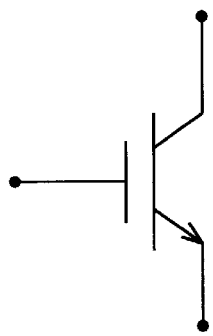
Figure 6D:
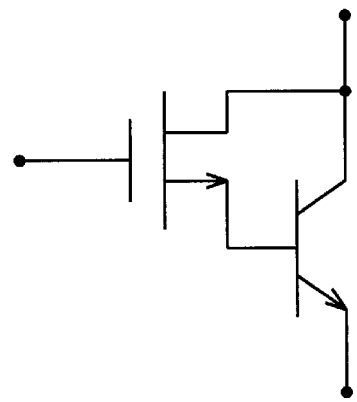

FIGS. 6a–6d show the possible implementations of the switch $S_2$. FIGS. 6a and 6b show the switch $S_2$ implemented respectively as a P-type and an N-type Metal Oxide Semiconductor (MOS) Field Effect Transistor (FET). FIG. 6c shows the switch $S_2$ implemented as an NPN bipolar junction transistor, while FIG. 6d shows the switch $S_2$ implemented as an FET driving an NPN bipolar junction transistor.

Referring back now to FIG. 5a, the biasing current source $J_b$ of the power down block pdb will provide sufficient current such the transistor $Q_1$ will remain conducting. The power down control function of FIG. 4 is performed by the level of the power down signal PWDN controlling the switch $S_1$. If the power down signal PWDN is at a first logic level (0), the switch $S_1$ will be closed and the biasing current source $J_b$ can operate. However, if the power down signal PWDN is at a logic second level (1), the biasing current source $J_b$ will be disabled. Disabling the biasing current source $J_b$ eliminates the base current $I_b$ from the transistor $Q_1$, thus placing the transistor $Q_1$ is a nonconductive state. This will stop the oscillator and cease transmission of the signal at terminal $V_o$ to conserve power during idle periods.

Figure 7A:
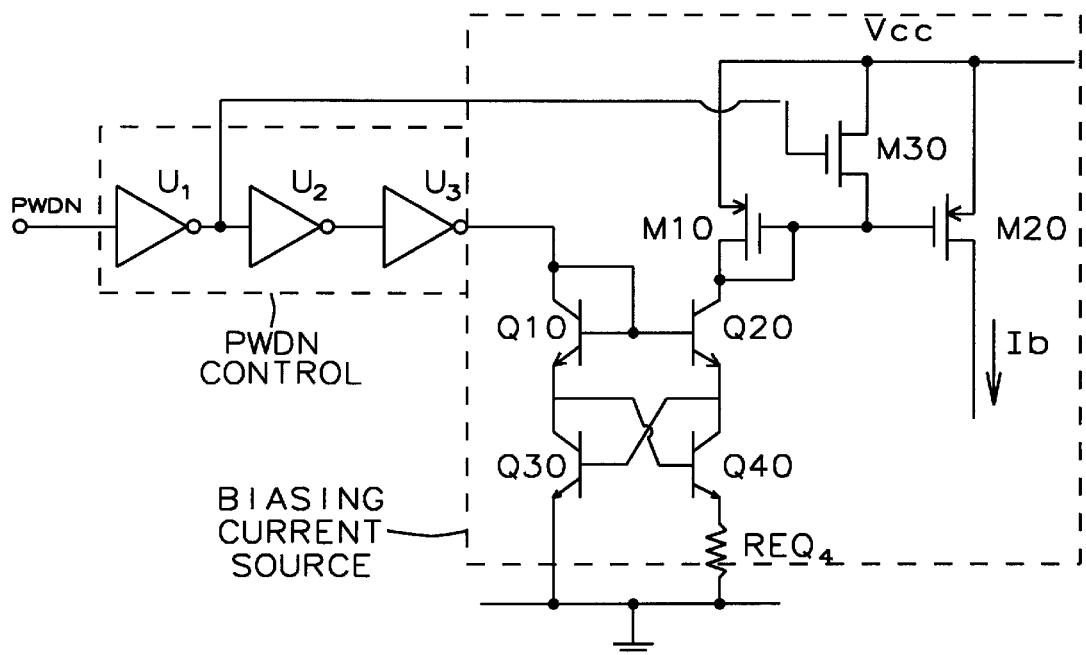
FIGS. 7a and 7b are schematic diagrams of an embodiment of the oscillator power down circuit of this invention.

Refer to FIG. 7a to understand the operation of the preferred embodiment of the power down block pdb of this invention. The inverters $U_1$, $U_2$, and $U_3$ form the power down control PWDN Control of FIG. 4a. The NPN transistors $Q_{10}$, $Q_{20}$, $Q_{30}$, and $Q_{40}$, the MOS FET's $M_{10}$, $M_{20}$, and $M_{30}$ as well as resistor $R_{eQ40}$ form the biasing current source $J_b$.

Many portable battery powered application require the FSK Oscillator of this invention to operate over a wide range of temperatures. The collector current of the transistor $Q_1$ of FIG. 5 is given by:

$$I_c = I_s \exp\left(\frac{qV_{be}}{kT}\right)$$

where:

$I_s$ is the saturation current of the transistor.

$V_{be}$ is the base to emitter voltage of the transistor.

q is the value of the electron charge.

k is Boltzmann's constant.

T is absolute temperature.

It is well known in the art that the $V_{be}$ decreases at the rate of approximately −2 mv per degree increase in absolute temperature. This implies that the collector current of $Q_1$ of FIG. 5, and hence the output power also decreases with temperature. This decrease in output power may be compensated by increasing the base current of $Q_1$ of FIG. 5a in proportion to absolute temperature.

Figure 7B:
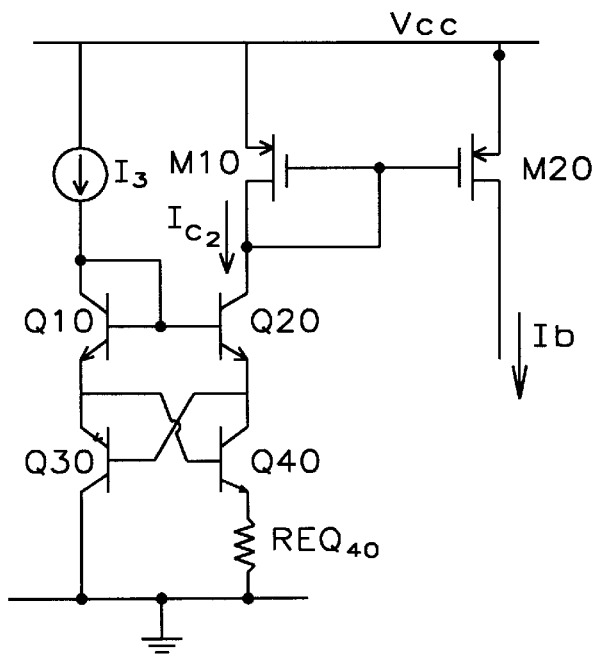

Refer now to FIG. 7b for a description of the biasing current source $J_b$ that is proportional to absolute temperature. It can be shown that the output current $I_b$ is given by:

$$I_b = I_{c20} = \frac{kT}{q} \cdot \frac{1}{R_{eQ40}} \cdot \ln\left(\frac{A_{10}A_{40}}{A_{20}A_{30}}\right) \qquad \text{Eq. 10}$$

where:
k=Boltzman's Constant
T=absolute temperature
q=the value of electronic charge
$A_{10}$, $A_{20}$, $A_{30}$, and $A_{40}$ are the areas of the emitters of the transistors $Q_{10}$, $Q_{20}$, $Q_{30}$, and $Q_{40}$.

Figure 8:
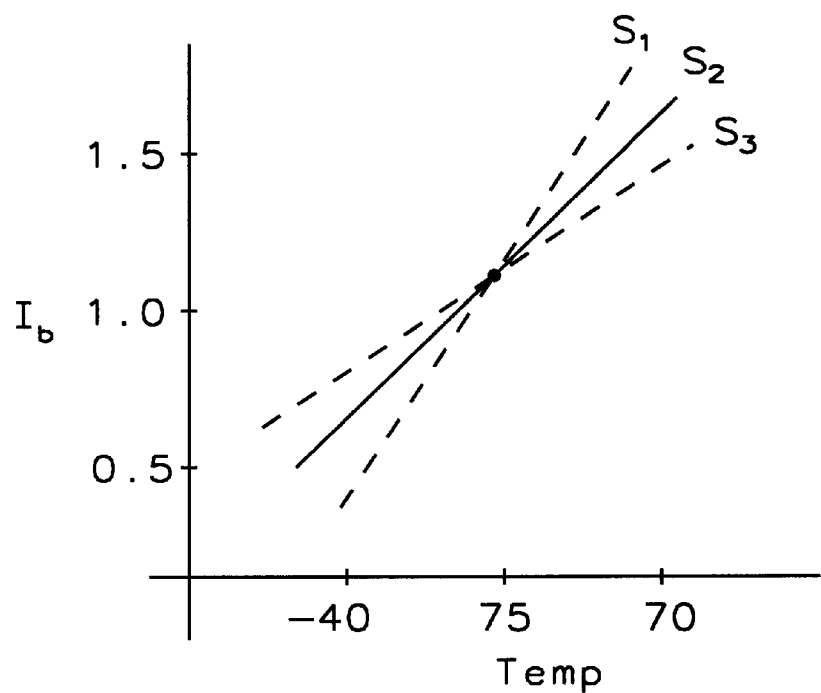
FIG. 8 is a plot of the current supplied by the power down block of this invention versus temperature for changes in circuit parameters.

From Eq. 10, it can be seen that the output current $I_b$ is proportional to the absolute temperature. It can also be seen that the slope of change in the output current $I_b$ can be modified by adjusting the resistance of the emitter resistance $R_{eQ40}$ and the areas of the emitters $A_{10}$, $A_{20}$, $A_{30}$, and $A_{40}$ of the transistors $Q_{10}$, $Q_{20}$, $Q_{30}$, and $Q_{40}$. To examine how the slope can be varied by adjusting the resistance of the emitter resistance $R_{eQ40}$ and the areas of the emitters $A_{10}$, $A_{20}$, $A_{30}$, and $A_{40}$ of the transistors $Q_{10}$, $Q_{20}$, $Q_{30}$, and $Q_{40}$, refer now to FIG. 8. The three lines $S_1$, $S_2$, and $S_3$ are plots of the output current $I_b$ versus temperature for three combinations of the resistance of the emitter resistance $R_{eQ40}$ and the areas of the emitters $A_{10}$, $A_{20}$, $A_{30}$, and $A_{40}$ of the transistors $Q_{10}$, $Q_{20}$, $Q_{30}$, and $Q_{40}$ by adjustment of the slope of the biasing current source, the output power of the FSK oscillator of FIG. 5a can be maintained at a reasonably constant level.

Refer back to FIG. 7a to examine the operation of the power down control PWDN Control. In this implementation of the preferred embodiment, the power down signal PWDN is active low. That is, when the logic state of the power down signal PWDN is a logic 0, the FSK oscillator of FIG. 5a will be able to transmit the FSK input signal FSK data and when the logic state of the power down signal PWDN is a logic 1, the FSK oscillator of FIG. 5a will be disabled.

If the power down signal PWDN is at the logic 0, the output of the inverter $U_3$ is at a logic 1 or approximately the level of the power supply voltage source $V_{cc}$. This will provide current $I_3$ of FIG. 7b to the collector of the transistor $Q_{10}$. At this same time, the output of inverter $U_1$ will also have its output level at a logic 1 or approximately the level of the power supply voltage source $V_{cc}$. This will cause the MOS FET $M_{30}$ to cease conduction and allow the biasing current source to operate as above described for FIG. 7b.

On the other hand, if the FSK oscillator is to be powered down, the power down signal is at a logic 1 and the output of the inverters $U_1$ and $U_3$ are at a logic 0 or approximately the ground reference potential. With the inverter $U_3$ at a logic 0, the current $I_3$ of FIG. 7b is not available to the collector of transistor $Q_{10}$. And with the inverter $U_1$ at a logic 0, the MOS FET $M_{30}$ is in full conduction thus placing the MOS FET's $M_{10}$ and $M_{20}$ in a nonconducting state, thus disabling the biasing current source $J_b$ of FIG. 5a and eliminating the current $I_b$. Without the biasing current source $J_b$, the transistor $Q_1$ of FIG. 5a will be nonconducting and the FSK oscillator will not be able to transmit the FSK input signal FSK data.

While this invention has been particularly shown and described with reference to the preferred embodiments thereof, it will be understood by those skilled in the art that various changes in form and details may be made without departing from the spirit and scope of the invention.

What is claimed is:

1. A multiple frequency shifting oscillator to provide a plurality of frequencies dependent upon a contents of an input shifting signal, comprising:

a) an amplifier having a first input, a second input coupled to a ground reference potential and an output;

b) a first impedance coupled between the first input and the ground reference potential;

c) a second impedance coupled between the output and the ground reference potential;

d) a third impedance coupled between the output and the first input;

e) a plurality of frequency shifting impedances that when selected will shift the frequency of said multiple frequency shifting oscillator;

f) a plurality of switches wherein each switch is connected so as to select one of the frequency shifting impedances to be connected to the first impedance;

g) a frequency shifting controller to selectively activate any of the plurality of switches to select any of the plurality of frequency shifting impedances dependent upon the contents of input shifting signal;

h) a temperature compensation biasing circuit connected between a power supply voltage source and said amplifier to provide a biasing to said amplifier, whereby said biasing compensates for degradation in amplitude at the output of said amplifier due to chances in temperature; and i) a power down control circuit connected between the power supply voltage source, the temperature compensation biasing circuit, and the amplifier to cause the power supply voltage source to be disconnected from the temperature compensation biasing circuit and the amplifier when said multiple frequency shifting oscillator has a power down control signal indicating that multiple frequency shifting oscillator should be non-operational.

2. The multiple frequency shifting oscillator of claim 1 wherein said amplifier comprises:

a) a bipolar junction transistor having a base, emitter, and a collector, whereby said collector is connected to a first electrode of said third impedance; and b) an emitter resistance coupled between the emitter and the ground reference potential to develop one of the plurality of frequencies.

3. The multiple frequency shifting oscillator of claim 1 wherein said amplifier comprises:

a) a metal oxide semiconductor field effect transistor having a gate, source, and a drain, whereby said drain is connected to a first electrode of said third impedance; and b) a source resistance coupled between the source and the ground reference potential to develop one of the plurality of frequencies.

4. The multiple frequency shifting oscillator of claim 1 wherein the first impedance comprises:

a) a piezoelectric resonator having a resonance frequency; and b) a first frequency modification capacitor coupled to the piezoelectric resonator to modify the resonance frequency of said piezoelectric resonator.

5. The multiple frequency shifting oscillator of claim 4 wherein the piezoelectric resonator is a surface acoustic wave resonator.

6. The multiple frequency shifting oscillator of claim 1 wherein the second impedance comprises:

a) an inductor coupled to the output of said amplifier; and b) a first capacitor and a second capacitor connected in series and together in parallel with said inductor to form a parallel resonant circuit.

7. The multiple frequency shifting oscillator of claim 1 wherein the third impedance is a parasitic impedance of said amplifier.

8. The multiple frequency shifting oscillator of claim 2 wherein the third impedance is a collector-base parasitic capacitance of said bipolar junction transistor.

9. The multiple frequency shifting oscillator of claim 2 wherein the power down control circuit comprises a power down switch to disable said base biasing current source during periods of time when said multiple frequency shifting oscillator is nonoperational.

10. The multiple frequency shifting oscillator of claim 1 wherein the plurality of frequency shifting impedance are capacitors.

11. The multiple frequency shifting oscillator of claim 1 wherein each of the plurality of switches are bipolar junction transistors.

12. The multiple frequency shifting oscillator of claim 1 wherein each of the plurality of switches are MOS FET's.

13. The multiple frequency shifting oscillator of claim 1 wherein each of the plurality of switches are MOS FET's connected so as to drive bipolar junction transistors.

14. A frequency shift keying oscillator to provide a first frequency for a digital data input of a first logic level and a second frequency for the digital data input of a second logic level; comprising:

a) an amplifier having a first input, a second input coupled to a ground reference potential and an output;

b) a first impedance coupled between the first input and the ground reference potential;

c) a second impedance coupled between the output and the ground reference potential;

d) a third impedance coupled between the output and the first input;

e) a frequency shifting impedance selectively coupled to said first impedance so as to cause said frequency shift keying oscillator to shift from the first frequency to the second frequency and when selectively decoupled from said first impedance will cause said frequency shift keying oscillator to shift from said second frequency to said first frequency;

f) a selecting switch to decouple said frequency shifting impedance from said first impedance when the digital data input is at the first level and to couple said frequency shifting impedance to said first impedance when the digital data input is at the second level;

g) a temperature compensation biasing circuit connected between a power supply voltage source and said amplifier to provide a biasing to said amplifier, whereby said biasing compensates for degradation in amplitude at the output of said amplifier due to changes in temperature; and h) a power down control circuit connected between the power supply voltage source, the temperature compensation biasing circuit, and the amplifier to cause the power supply voltage source to be disconnected from the temperature compensation biasing circuit and the amplifier when said multiple frequency shifting oscillator has a power down control signal indicating that multiple frequency shifting oscillator should be nonoperational.

15. The frequency shift keying oscillator of claim 14 wherein said amplifier comprises:

a) a bipolar junction transistor having a base, emitter, and a collector, whereby said collector is connected to a first electrode of said third impedance; and b) an emitter resistance coupled between the emitter and the ground reference potential to develop one of the plurality of frequencies.

16. The frequency shift keying oscillator of claim 14 wherein said amplifier comprises:

a) a metal oxide semiconductor field effect transistor having a gate, source, and a drain, whereby said drain is connected to a first electrode of said third impedance; and b) a source resistance coupled between the source and the ground reference potential to develop one of the plurality of frequencies.

17. The frequency shift keying oscillator of claim 14 wherein the first impedance comprises:

a) a piezoelectric resonator having a resonance frequency; and b) a first frequency modification capacitor coupled to the piezoelectric resonator to modify the resonance frequency of said piezoelectric resonator.

18. The frequency shift keying oscillator of claim 17 wherein the piezoelectric resonator is a surface acoustic wave resonator.

19. The frequency shift keying oscillator of claim 14 wherein the second impedance comprises:

a) an inductor coupled to the output of said amplifier; and b) a first capacitor and a second capacitor connected in series and together in parallel with said inductor to form a parallel resonant circuit.

20. The frequency shift keying oscillator of claim 14 wherein the third impedance is a parasitic impedance of said amplifier.

21. The frequency shift keying oscillator of claim 15 wherein the third impedance is a collector-base parasitic capacitance of said bipolar junction transistor.

22. The frequency shift keying oscillator of claim 14 wherein the power down control circuit comprises a power down switch to disable said base biasing current source during periods of time when said multiple frequency shifting oscillator is nonoperational.

23. The frequency shift keying oscillator of claim 14 wherein the frequency shifting impedance is a capacitor.

24. The frequency shift keying oscillator of claim 14 wherein the switch is a bipolar junction transistor.

25. The frequency shift keying oscillator of claim 14 the switch is a MOS FET.

26. The frequency shift keying oscillator of claim 14 wherein the switch is a MOS FET connected so as to drive bipolar junction transistor.

27. A Colpitts frequency shift keying oscillator to provide a first frequency for a digital data input of a first logic level and a second frequency for the digital data input of a second logic level; comprising:

a) a bipolar junction transistor having a base, emitter, and collector;

b) a surface acoustic wave resonator having a first terminal coupled to said base;

c) a first capacitor connected between a second terminal of said surface acoustic wave resonator;

d) an emitter resistor coupled between the emitter and a ground reference potential;

e) a second capacitor connected in parallel with said emitter resistor;

f) a third capacitor connected between the collector and the emitter;

g) an inductance connected between the collector and a power supply voltage source;

h) an output terminal to couple said Colpitts frequency shift keying oscillator to external circuitry;

i) a frequency shifting means connected in parallel with the first capacitor and connected to said digital data input to control the shifting of said Colpitts oscillator between said first frequency and said second frequency;

j) a base biasing means connected between the base and the power supply voltage source and having a power down terminal; whereby said base biasing means supplies a base current to said base when said power down terminal indicates an operational mode for said Colpitts frequency shift keying oscillator and inhibits said base current to said base when said power down terminal indicates a nonoperational mode, whereby said base biasing means adjusts said base current to said base to maintain a constant magnitude at said output terminal when temperature varies.

28. The Colpitts frequency shift keying oscillator of claim 27 wherein said base biasing means comprises:

a) a current source to supply said base biasing current wherein said base biasing current is proportional to absolute temperature; and b) a power down switch coupled to the power down control terminal to enable said current source when said power down control indicates the operational mode and inhibits said current source when the power down control terminal indicates the nonoperational mode.

29. The Colpitts frequency shift keying oscillator of claim 27 wherein said frequency shifting means comprises:

a) a frequency shifting capacitor to shift said Colpitts frequency shift keying oscillator between the first and second frequencies; and b) a shifting switch to couple the frequency shifting capacitor to the first capacitor for a digital input having the second logic level and to decouple the frequency shifting capacitor from said first capacitor for a digital data input having the second logic level.

30. A Colpitts frequency shift keying oscillator to provide a first frequency for a digital data input of a first logic level and a second frequency for the digital data input of a second logic level; comprising:

a) a bipolar junction transistor having a base, emitter, and collector;

b) a surface acoustic wave resonator having a first terminal coupled to said base;

c) a first capacitor connected between a second terminal of said surface acoustic wave resonator;

d) an emitter resistor coupled between the emitter and a ground reference potential;

e) a second capacitor connected in parallel with said emitter resistor;

f) a third capacitor connected between the collector and the emitter;

g) an inductance connected between the collector and a power supply voltage source;

h) an output terminal to couple said Colpitts frequency shift keying oscillator to external circuitry;

i) a frequency shifting means connected in parallel with the first capacitor and connected to said digital data input to control the shifting of said Colpitts oscillator between said first frequency and said second wherein said frequency shifting means comprises:

a frequency shifting capacitor to shift said Colpitts frequency shift keying oscillator between the first and second frequencies; and a shifting switch to couple the frequency shifting capacitor to the first capacitor for a digital input having the second logic level and to decouple the frequency shifting capacitor from said first capacitor for a digital data input having the second logic level and j) a base biasing means coupled to the base to supply a base biasing current, whereby said base biasing means adjusts said base biasing current to said base to maintain a constant magnitude at said output terminal when temperature varies.

31. The Colpitts frequency shift keying oscillator of claim 30 wherein said base biasing means is connected between the base and the power supply voltage source and having a power down terminal; whereby said base biasing means supplies a base current to said base when said power down terminal indicates an operational mode for said Colpitts frequency shift keying oscillator and inhibits said base current to said base when said power down terminal indicates, and wherein said base biasing means comprises:

a) a current source to supply said base biasing current wherein said base biasing current is proportional to absolute temperature; and b) a power down switch coupled to the power down control terminal to enable said current source when said power down control indicates the operational mode and inhibits said current source when the power down control terminal indicates the nonoperational mode.

32. The multiple frequency shifting oscillator of claim 2 wherein the temperature compensation biasing circuit comprises a base biasing current source connected between the base and a power supply voltage source to provide sufficient biasing current to insure said bipolar junction transistor is in a conducting state, whereby said biasing current does not change with temperature.

33. The multiple frequency shifting oscillator of claim 3 wherein the temperature compensation biasing circuit comprises a gate biasing voltage source connected between the gate and ground reference potential to provide sufficient biasing voltage to insure said metal oxide semiconductor field effect transistor is in a conducting state, whereby said biasing voltage does not change with temperature.

34. The multiple frequency shifting oscillator of claim 15 wherein the temperature compensation biasing circuit comprises a base biasing current source connected between the base and a power supply voltage source to provide sufficient biasing current to insure said bipolar junction transistor is in a conducting state, whereby said biasing current does not change with temperature.

35. The multiple frequency shifting oscillator of claim 16 wherein the temperature compensation biasing circuit comprises a gate biasing voltage source connected between the gate and ground reference potential to provide sufficient biasing voltage to insure said metal oxide semiconductor field effect transistor is in a conducting state, whereby said biasing voltage does not change with temperature.

* * * * *